(12) United States Patent
Gaillat

(10) Patent No.: US 10,789,072 B2
(45) Date of Patent: Sep. 29, 2020

(54) PARALLEL PROCESSOR FOR CALCULATING OPERAND AND RESULT ADDRESSES AS A FUNCTION OF A POSITION OF A FIELD OF ACTION AND PREDETERMINED POSITIONS OF PROCESSING ELEMENTS IN NON-HOMOGENEOUS ADDRESS ZONES WITHIN A TOPOLOGY

(75) Inventor: Gérard Gaillat, Chaville (FR)

(73) Assignee: THALES, Courbevoie (FR)

( * ) Notice: Subject to any disclaimer, the term of this patent is extended or adjusted under 35 U.S.C. 154(b) by 1517 days.

(21) Appl. No.: 12/666,551

(22) PCT Filed: Jun. 26, 2008

(86) PCT No.: PCT/EP2008/058141
§ 371 (c)(1),
(2), (4) Date: Jun. 11, 2010

(87) PCT Pub. No.: WO2009/000880
PCT Pub. Date: Dec. 31, 2008

(65) Prior Publication Data
US 2010/0250897 A1   Sep. 30, 2010

(30) Foreign Application Priority Data
Jun. 26, 2007   (FR) .................................. 07 04574

(51) Int. Cl.
*G06F 15/80* (2006.01)
*G06F 9/345* (2018.01)
*G06F 9/38* (2018.01)

(52) U.S. Cl.
CPC ............ *G06F 9/345* (2013.01); *G06F 9/3887* (2013.01); *G06F 15/8007* (2013.01)

(58) Field of Classification Search
CPC .......... G06F 9/34; G06F 9/345; G06F 9/3887; G06F 12/02; G06F 12/0207; G06F 15/80; G06F 15/8007
See application file for complete search history.

(56) References Cited

U.S. PATENT DOCUMENTS 5,581,777 A   12/1996  Kim et al.
6,105,125 A *  8/2000  Nemirovsky ........... G06F 9/223
                                                                 712/209

(Continued)

FOREIGN PATENT DOCUMENTS

GB      2 417 105 A      2/2006

*Primary Examiner* — David J. Huisman
(74) *Attorney, Agent, or Firm* — Baker & Hostetler LLP

(57) ABSTRACT

A parallel processor comprising elementary processors disposed according to a topology with a predetermined position within this topology and capable of simultaneously executing the same instruction on different data, the instruction relating to at least one operand and/or providing at least one result The instruction comprises, for each operand and/or each result, information relating to the position of a field of action within a table data structure of dimension N type, and the parallel processor calculates the address of each operand and calculates the address of each result within each elementary processor, as a function of the position of the field of action and of the position of the elementary processor within the topology.

18 Claims, 9 Drawing Sheets

(56) References Cited

U.S. PATENT DOCUMENTS

| 6,233,596 B1 * | 5/2001 | Kubota | G06F 7/5443 |
| | | | 708/523 |
| 6,834,295 B2 * | 12/2004 | Barry et al. | 709/212 |
| 7,596,679 B2 * | 9/2009 | Abbo et al. | 712/22 |
| 2008/0209164 A1 * | 8/2008 | Wildman | 712/22 |

* cited by examiner

|     |     | 0  | 1  | 2  | 3  | 4  | 5  | 6  | 7  | 8  | 9  | 10 | 11 | 12 | 13 | 14 | 15 | ... | 63  |
|-----|-----|----|----|----|----|----|----|----|----|----|----|----|----|----|----|----|----|-----|-----|
| P0  | 0   | 0  | 1  | 2  | 3  | 4  | 5  | 6  | 7  | 8  | 9  | 10 | 11 | 12 | 13 | 14 | 15 | ... | 63  |
| P1  | 1   | 0  | 1  | 2  | 3  | 4  | 5  | 6  | 7  | 8  | 9  | 10 | 11 | 12 | 13 | 14 | 15 | ... | 63  |
| P2  | 2   | 0  | 1  | 2  | 3  | 4  | 5  | 6  | 7  | 8  | 9  | 10 | 11 | 12 | 13 | 14 | 15 | ... | 63  |
| P3  | 3   | 0  | 1  | 2  | 3  | 4  | 5  | 6  | 7  | 8  | 9  | 10 | 11 | 12 | 13 | 14 | 15 | ... | 63  |
| P4  | 4   | 0  | 1  | 2  | 3  | 4  | 5  | 6  | 7  | 8  | 9  | 10 | 11 | 12 | 13 | 14 | 15 | ... | 63  |
| P5  | 5   | 0  | 1  | 2  | 3  | 4  | 5  | 6  | 7  | 8  | 9  | 10 | 11 | 12 | 13 | 14 | 15 | ... | 63  |
| P6  | 6   | 0  | 1  | 2  | 3  | 4  | 5  | 6  | 7  | 8  | 9  | 10 | 11 | 12 | 13 | 14 | 15 | ... | 63  |
| P7  | 7   | 0  | 1  | 2  | 3  | 4  | 5  | 6  | 7  | 8  | 9  | 10 | 11 | 12 | 13 | 14 | 15 | ... | 63  |
| P8  | 8   | 0  | 1  | 2  | 3  | 4  | 5  | 6  | 7  | 8  | 9  | 10 | 11 | 12 | 13 | 14 | 15 | ... | 63  |
| P9  | 9   | 0  | 1  | 2  | 3  | 4  | 5  | 6  | 7  | 8  | 9  | 10 | 11 | 12 | 13 | 14 | 15 | ... | 63  |
| P10 | 10  | 0  | 1  | 2  | 3  | 4  | 5  | 6  | 7  | 8  | 9  | 10 | 11 | 12 | 13 | 14 | 15 | ... | 63  |
| P11 | 11  | 0  | 1  | 2  | 3  | 4  | 5  | 6  | 7  | 8  | 9  | 10 | 11 | 12 | 13 | 14 | 15 | ... | 63  |
| P12 | 12  | 0  | 1  | 2  | 3  | 4  | 5  | 6  | 7  | 8  | 9  | 10 | 11 | 12 | 13 | 14 | 15 | ... | 63  |
| P13 | 13  | 0  | 1  | 2  | 3  | 4  | 5  | 6  | 7  | 8  | 9  | 10 | 11 | 12 | 13 | 14 | 15 | ... | 63  |
| P14 | 14  | 0  | 1  | 2  | 3  | 4  | 5  | 6  | 7  | 8  | 9  | 10 | 11 | 12 | 13 | 14 | 15 | ... | 63  |
| P15 | 15  | 0  | 1  | 2  | 3  | 4  | 5  | 6  | 7  | 8  | 9  | 10 | 11 | 12 | 13 | 14 | 15 | ... | 63  |
| P0  | 16  | 64 | 65 | 66 | 67 | 68 | 69 | 70 | 71 | 72 | 73 | 74 | 75 | 76 | 77 | 78 | 79 | ... | 127 |
| P1  | 17  | 64 | 65 | 66 | 67 | 68 | 69 | 70 | 71 | 72 | 73 | 74 | 75 | 76 | 77 | 78 | 79 | ... | 127 |
| P2  | 18  | 64 | 65 | 66 | 67 | 68 | 69 | 70 | 71 | 72 | 73 | 74 | 75 | 76 | 77 | 78 | 79 | ... | 127 |
| P3  | 19  | 64 | 65 | 66 | 67 | 68 | 69 | 70 | 71 | 72 | 73 | 74 | 75 | 76 | 77 | 78 | 79 | ... | 127 |
| P4  | 20  | 64 | 65 | 66 | 67 | 68 | 69 | 70 | 71 | 72 | 73 | 74 | 75 | 76 | 77 | 78 | 79 | ... | 127 |
| P5  | 21  | 64 | 65 | 66 | 67 | 68 | 69 | 70 | 71 | 72 | 73 | 74 | 75 | 76 | 77 | 78 | 79 | ... | 127 |
| P6  | 22  | 64 | 65 | 66 | 67 | 68 | 69 | 70 | 71 | 72 | 73 | 74 | 75 | 76 | 77 | 78 | 79 | ... | 127 |
| P7  | 23  | 64 | 65 | 66 | 67 | 68 | 69 | 70 | 71 | 72 | 73 | 74 | 75 | 76 | 77 | 78 | 79 | ... | 127 |
| ... | ... | ...| ...| ...| ...| ...| ...| ...| ...| ...| ...| ...| ...| ...| ...| ...| ...| ... | ... |

FIG. 2

|    | ... | P6 | P7 | P8 | P9 | P10 | P11 | P12 | P13 | P14 | P15 | P0 | P1 | P2 | P3 | P4 | P5 | P6 | P7 | P8 | ...P15 |
|----|-----|----|----|----|----|-----|-----|-----|-----|-----|-----|----|----|----|----|----|----|----|----|----|--------|
|    | ... | 6  | 7  | 8  | 9  | 10  | 11  | 12  | 13  | 14  | 15  | 16 | 17 | 18 | 19 | 20 | 21 | 22 | 23 | 24 | ... 63 |
| 0  | ... | 0  | 0  | 0  | 0  | 0   | 0   | 0   | 0   | 0   | 0   | 1  | 1  | 1  | 1  | 1  | 1  | 1  | 1  | 1  | ... 3  |
| 1  | ... | 4  | 4  | 4  | 4  | 4   | 4   | 4   | 4   | 4   | 4   | 5  | 5  | 5  | 5  | 5  | 5  | 5  | 5  | 5  | ... 7  |
| 2  | ... | 8  | 8  | 8  | 8  | 8   | 8   | 8   | 8   | 8   | 8   | 9  | 9  | 9  | 9  | 9  | 9  | 9  | 9  | 9  | ... 11 |
| 3  | ... | 12 | 12 | 12 | 12 | 12  | 12  | 12  | 12  | 12  | 12  | 13 | 13 | 13 | 13 | 13 | 13 | 13 | 13 | 13 | ... 15 |
| 4  | ... | 16 | 16 | 16 | 16 | 16  | 16  | 16  | 16  | 16  | 16  | 17 | 17 | 17 | 17 | 17 | 17 | 17 | 17 | 17 | ... 19 |
| 5  | ... | 20 | 20 | 20 | 20 | 20  | 20  | 20  | 20  | 20  | 20  | 21 | 21 | 21 | 21 | 21 | 21 | 21 | 21 | 21 | ... 23 |
| 6  | ... | 24 | 24 | 24 | 24 | 24  | 24  | 24  | 24  | 24  | 24  | 25 | 25 | 25 | 25 | 25 | 25 | 25 | 25 | 25 | ... 27 |
| 7  | ... | 28 | 28 | 28 | 28 | 28  | 28  | 28  | 28  | 28  | 28  | 29 | 29 | 29 | 29 | 29 | 29 | 29 | 29 | 29 | ... 31 |
| 8  | ... | 32 | 32 | 32 | 32 | 32  | 32  | 32  | 32  | 32  | 32  | 33 | 33 | 33 | 33 | 33 | 33 | 33 | 33 | 33 | ... 35 |
| 9  | ... | 36 | 36 | 36 | 36 | 36  | 36  | 36  | 36  | 36  | 36  | 37 | 37 | 37 | 37 | 37 | 37 | 37 | 37 | 37 | ... 39 |
| 10 | ... | 40 | 40 | 40 | 40 | 40  | 40  | 40  | 40  | 40  | 40  | 41 | 41 | 41 | 41 | 41 | 41 | 41 | 41 | 41 | ... 43 |
| 11 | ... | 44 | 44 | 44 | 44 | 44  | 44  | 44  | 44  | 44  | 44  | 45 | 45 | 45 | 45 | 45 | 45 | 45 | 45 | 45 | ... 47 |
| 12 | ... | 48 | 48 | 48 | 48 | 48  | 48  | 48  | 48  | 48  | 48  | 49 | 49 | 49 | 49 | 49 | 49 | 49 | 49 | 49 | ... 51 |
| 13 | ... | 52 | 52 | 52 | 52 | 52  | 52  | 52  | 52  | 52  | 52  | 53 | 53 | 53 | 53 | 53 | 53 | 53 | 53 | 53 | ... 55 |
| 14 | ... | 56 | 56 | 56 | 56 | 56  | 56  | 56  | 56  | 56  | 56  | 57 | 57 | 57 | 57 | 57 | 57 | 57 | 57 | 57 | ... 59 |
| 15 | ... | 60 | 60 | 60 | 60 | 60  | 60  | 60  | 60  | 60  | 60  | 61 | 61 | 61 | 61 | 61 | 61 | 61 | 61 | 61 | ... 63 |
| 16 | ... | 64 | 64 | 64 | 64 | 64  | 64  | 64  | 64  | 64  | 64  | 65 | 65 | 65 | 65 | 65 | 65 | 65 | 65 | 65 | ... 67 |
| 17 | ... | 68 | 68 | 68 | 68 | 68  | 68  | 68  | 68  | 68  | 68  | 69 | 69 | 69 | 69 | 69 | 69 | 69 | 69 | 69 | ... 71 |
| 18 | ... | 72 | 72 | 72 | 72 | 72  | 72  | 72  | 72  | 72  | 72  | 73 | 73 | 73 | 73 | 73 | 73 | 73 | 73 | 73 | ... 75 |
| 19 | ... | 76 | 76 | 76 | 76 | 76  | 76  | 76  | 76  | 76  | 76  | 77 | 77 | 77 | 77 | 77 | 77 | 77 | 77 | 77 | ... 79 |
| ...| ... |... |... |... |... |...  |...  |...  |...  |...  |...  |... |... |... |... |... |... |... |... |... | ...    |

| ADDRESSES WITHIN THE PROCESSORS | 0 | 1 | 2 | 3 | 4 | 5 | 6 | 7 | 8 | 9 | 10 | 11 | 12 | 13 | 14 | 15 | ... | 60 | 61 | 62 | 63 |
|---|---|---|---|---|---|---|---|---|---|---|---|---|---|---|---|---|---|---|---|---|---|
| 0 | 0 | 0 | 0 | 0 | 16 | 16 | 16 | 16 | 2 | 2 | 2 | 2 | 3 | 3 | 3 | 3 | ... | 15 | 15 | 15 | 15 |
| 1 | 0 | 0 | 0 | 0 | 16 | 16 | 16 | 16 | 2 | 2 | 2 | 2 | 3 | 3 | 3 | 3 | ... | 15 | 15 | 15 | 15 |
| 2 | 0 | 0 | 0 | 0 | 16 | 16 | 16 | 16 | 2 | 2 | 2 | 2 | 3 | 3 | 3 | 3 | ... | 15 | 15 | 15 | 15 |
| 3 | 0 | 0 | 0 | 0 | 16 | 16 | 16 | 16 | 2 | 2 | 2 | 2 | 3 | 3 | 3 | 3 | ... | 15 | 15 | 15 | 15 |
| 4 | 1 | 1 | 1 | 1 | 17 | 17 | 17 | 17 | 18 | 18 | 18 | 18 | 19 | 19 | 19 | 19 | ... | 31 | 31 | 31 | 31 |
| 5 | 1 | 1 | 1 | 1 | 17 | 17 | 17 | 17 | 18 | 18 | 18 | 18 | 19 | 19 | 19 | 19 | ... | 31 | 31 | 31 | 31 |
| 6 | 1 | 1 | 1 | 1 | 17 | 17 | 17 | 17 | 18 | 18 | 18 | 18 | 19 | 19 | 19 | 19 | ... | 31 | 31 | 31 | 31 |
| 7 | 1 | 1 | 1 | 1 | 17 | 17 | 17 | 17 | 18 | 18 | 18 | 18 | 19 | 19 | 19 | 19 | ... | 31 | 31 | 31 | 31 |
| 8 | 2 | 2 | 2 | 2 | 18 | 18 | 18 | 18 | 18 | 34 | 34 | 34 | 35 | 35 | 35 | 35 | ... | 47 | 47 | 47 | 47 |
| 9 | 2 | 2 | 2 | 2 | 18 | 18 | 18 | 18 | 34 | 34 | 34 | 34 | 35 | 35 | 35 | 35 | ... | 47 | 47 | 47 | 47 |
| 10 | 2 | 2 | 2 | 2 | 18 | 18 | 18 | 18 | 34 | 34 | 34 | 34 | 35 | 35 | 35 | 35 | ... | 47 | 47 | 47 | 47 |
| 11 | 2 | 2 | 2 | 2 | 18 | 18 | 18 | 18 | 34 | 34 | 34 | 34 | 35 | 35 | 35 | 35 | ... | 47 | 47 | 47 | 47 |

FIG. 4B

PARALLEL PROCESSOR FOR CALCULATING OPERAND AND RESULT ADDRESSES AS A FUNCTION OF A POSITION OF A FIELD OF ACTION AND PREDETERMINED POSITIONS OF PROCESSING ELEMENTS IN NON-HOMOGENEOUS ADDRESS ZONES WITHIN A TOPOLOGY

FIELD OF THE INVENTION

The present invention relates to an addressing device for a parallel processor, applicable in particular to parallel computers of the SIMD type.

BACKGROUND OF THE INVENTION

The term SIMD refers to the classification of parallel computers introduced by Flynn. It denotes a parallel computer of the Single Instruction Multiple Data Stream (SIMD) type.

In the past, one or more electronic boards were necessary in order to implement an SIMD. Today an SIMD can be located on a single integrated circuit, for example an FPGA or an ASIC.

An SIMD described with reference to FIG. 1, comprises
a single sequencer 1,
a single instruction memory 2,
a large number of elementary processors 3 or Processing Elements (PEs).
Each PE 3 comprises
an Arithmetic and Logic Unit (ALU) 31,
a set of memories and/or data registers 32.
In each cycle, the sequencer
determines the next instruction and reads it from the instruction memory,
transmits this instruction to all of the PEs.
Most of the instructions define:
an operation to be executed
the address Ad from which to fetch each operand of the operation
the address or addresses Ad at which to store the result.
The operation to be executed comprises one or more operands. It can be limited to an elementary operation (for example a sign inversion or an addition or an if or a maximum calculation) comprising one or more operands or it can be a combination of several elementary operations (for example: a multiplication followed by an addition). Similarly, the result can be stored at one or more addresses.

Each PE executes this same instruction at the same time but on different data, in this instance on the set of memories and/or registers belonging to it.

The expression "in each cycle" of course refers to a logic cycle whose execution can extend over several physical cycles according to the conventional pipeline technique. The important thing is that a new instruction is started in each cycle and that a new instruction is completed in each cycle. It does not matter if the execution of the instruction extends over several cycles.

Take for example the instruction R(23)=R(8)+R(3)*R (19). It signifies reading the content of the register 3, multiplying it by the content of the register 19, adding the result of this multiplication to the content of the register 8 and writing the result of this addition in the register 23. This same instruction will be executed in parallel by all of the PEs. However, each one will execute it on the set of registers belonging to it. In total, if there are 128 PEs, the execution of the instruction will result in 128 registers 3 being read, 128 registers 19 being read, 128 registers 8 being read, 128 multiplications will be carried out on two times 128 different values, 128 additions will be carried out on two times 128 different values and 128 different results will be written in 128 registers 23.

The efficiency of an SIMD results from this high degree of parallelism.

In general, on an SIMD, each PE has the possibility of reading, that is to say of fetching, the operands of an instruction, not only from the set of memories and/or registers belonging to it but also from all or some of the set of memories and/or registers which belong to one of its neighbors. A variant which can be a complement or an alternative is that each PE has the possibility of writing the result of an instruction not only in memories and/or registers which belong to it but also in memories and/or registers which belong to one of its neighbors.

The concept of neighborhood between PEs is defined by the architecture of the SIMD and more precisely by the interconnection topology between PEs. Several interconnection topologies between PEs have been proposed. The most complex ones are genuine interconnection networks between PEs. The simplest one is a vertical column of PEs. Another simple topology is a bidimensional grid of PEs. It is also possible to imagine multidimensional grids of PEs. In general, in these last three cases, the ends are "rejoined". Thus, in the mono-dimensional topology, the vertical column of PEs becomes a circle of PEs (the term "ring of PEs" is often used). Because of this rejoining, the most Southern South neighbor of the PE is the most Northern PE and the most Northern North neighbor of the PE is the most Southern PE. Similarly, in the bidimensional topology, the grid of PEs becomes a toroid. Finally, in the multidimensional topology, the multidimensional grid becomes a multidimensional toroid.

In the case of a mono-dimensional topology (vertical column or ring of PEs), each PE has two neighbors which are called N and S (for North and South). In the case of a bidimensional topology (bidimensional grid or toroid of PEs), each PE has four neighbors which are called N, S, E, W (for North, South, East and West). In the case of a multidimensional topology, (multidimensional grid or multidimensional toroid of PEs), each PE has $2^n$ neighbors, where n is the space dimension.

In the rest of this document, the case of mono-dimensional topologies will be considered first, then the case of bidimensional topologies and then the case of multidimensional topologies.

A typical instruction on a modern SIMD requests all of the PEs (or some of them) to carry out an operation, the same one for all of them, relating to several operands and to store the result in one or more locations. Returning to the previous example, the instruction R(23)=R(8)+R(3)*R(19) requests all of the PEs to carry out an operation relating to 3 operands and to store the result in one location.

In most SIMDs, the instruction defines, for each operand and for each result, the address where the different PEs will read the operand (or store the result). Consequently, for a given operand, as for a given result location, the address is necessarily the same for all of the PEs.

Such an approach raises a problem, notably in typical applications like image processing, image compression, synthetic image generation, signal processing or certain techniques for solving partial differential equations. For example, when these applications use algorithms in which a pixel is calculated from its neighbors, and doing so whether the topology of the PEs is mono-, bi- or multi-dimensional.

In order to illustrate this difficulty, an example using image processing is taken and analyzed considering an SIMD of 16 PEs organized in a ring.

In all of the rest of this document and in order to simplify the mathematical formulae, the processors are numbered starting from 0; as are the lines and the columns of a data structure (signal, image or volume).

Firstly, a topology of 1-dimensional processors (a ring) is studied. Secondly, the generalization to the case of P dimensional processor topologies is studied with reference to certain examples described below.

A conventional way of placing the pixels of the image in the memories of the different PEs is to use PE0 (PE N° 0) for storing and processing line 0 of the image, PE1 (PE N° 1) for storing and processing line 1, and so on up to PE15 (PE N° 15) for storing and processing line 15. As an image generally comprises more than 16 lines, the user will use PE0 for storing and processing lines 0, 16, 32, 48, 64, 80, . . . of the image, PE1 for storing and processing lines 1, 17, 33, 49, 65, 81, . . . of the image and so on up to PE15 for storing and processing lines 15, 31, 47, 63, 79, 95, . . . of the image.

In this storage system, if Np denotes the number of PEs and if Lx denotes the width of the image to be processed, a pixel having the coordinates (x, y) is stored in the processor p at the address Ad according to the following formulae:

$$p = y \bmod Np$$

$$Ad = x + Lx * \text{Int}(y/Np), (\text{Int}(z) \text{ denoting the integer part of } z).$$

This storage system is shown in FIG. 2. This figure considers the case of an image of width 64 pixels and shows a usual method of storing it in an SIMD of 16 PEs organized with ring topology. In this figure, the columns represent the columns of the image, the lines represent the lines of the image, the number of the PE is indicated at the extreme left of each line and the address where each pixel is stored is indicated inside each box. In this figure, as in the following two figures, the boundaries between zones with homogeneous addresses (zone having the same address in all of the PEs) are indicated by black lines.

By convention, a visual representation has been chosen in which the left of an image is constituted by pixels having low x coordinates whereas the top of the image is constituted by pixels having low y coordinates. Thus, the top left corner of a square whose edges are parallel with the axes of the coordinates is the point of lowest x coordinate and of lowest y coordinate whereas the bottom right corner is the point of highest x coordinate and of highest y coordinate. This convention is used hereafter.

This storage system amounts to considering the SIMD as a vertical ring of PEs. The reverse choice could obviously be made consisting in considering the SIMD not as a vertical ring of PEs but as a horizontal ring and using the PEs no longer for storing the lines but for storing the columns of the image. FIG. 3 shows this storage system. In reality, it is only a matter of choice of visual representation for the programmer which changes virtually nothing at the level of the machine. What is described hereafter concerning a representation in lines is obviously applicable to a representation in columns.

The type of allocation of lines of the image to the PEs described above does not raise any problems when it is a matter of simple operations like the addition of two images, the multiplication of two images, the multiplication of an image by a constant, the convolution of an image by a line mask, . . . , in fact when it is a matter of simple operations in which the pixels serving as operands and the result pixel are stored by the same PE.

Things become more complicated when it is a matter of operations in which the pixels serving as operands and the result pixel are stored by different PEs. For example, in the case of the convolution of an image by a two-dimensional mask, the PE which is responsible for storing the result pixel must fetch the operands which it needs in order to carry out its calculations not only in the memories and/or registers which belong to it but also in memories and/or registers which belong to neighboring PEs, or even to neighbors of neighbors, or even farther.

Let it be assumed that it is desired to carry out a 3×3 convolution on a 32×32 square whose top left corner has the coordinates x=8, y=4 and whose bottom right corner has the coordinates x=39, y=35 and to store the result in a 32×32 square whose top left corner has the coordinates x=8, y=68 and whose bottom right corner has the coordinates x=39, y=99. It is recalled, as mentioned above, that in the xy reference in question, the x axis is increasing from left to right and the y axis from top to bottom.

Let a(−1, −1), a(0, −1), a(1, −1), a(−1, 0), a(0, 0), a(1, 0), a(−1, 1), a(0, 1), and a(1, 1) be the nine coefficients of the convolution filter.

Let I(x, y) be the pixels of the original image.

Let R(x, y+64) be the pixels of the result image.

The calculation to be carried out, for each value of x between 8 and 39 and for each value of y between 4 and 35 is as follows:

$$R(x, y+64) = a(-1, -1) * I(x-1, y-1) + a(0, -1) * I(x, y-1) +$$
$$a(1, -1) * I(x+1, y-1) + a(-1, 0) * I(x-1, y) +$$
$$a(0, 0) * I(x, y) + a(1, 0) * I(x+1, y) + a(-1, 1) * I(x-1, y+1) +$$
$$a(0, 1) * I(x, y+1) + a(1, 1)) * I(x+1, y+1).$$

The first operation is to carry out this convolution on a 16×1 vertical segment whose top end has the coordinates x=8, y=4 and whose bottom end has the coordinates x=8, y=19. This segment is shown in dark gray in FIG. 2. The first step of this first operation is to read a 16×1 vertical segment whose top end has the coordinates x=7, y=3 and whose bottom end has the coordinates x=7, y=18. This segment is shown in light gray in FIG. 2. Each of the 16 pixels read is multiplied by the first coefficient of the convolution mask. The next step is to read a 16×1 vertical segment whose top end has the coordinates x=8, y=3 and whose bottom end has the coordinates x=8, y=18. Each of the 16 pixels read is multiplied by the second coefficient of the convolution mask and the result of this second multiplication is added to the result of the first multiplication. This procedure continues in this way for the nine coefficients of the convolution mask (nine coefficients because a 3×3 convolution was taken as an example). The result is thus stored on a 16×1 vertical segment whose top end has the coordinates x=8, y=68 and whose bottom and has the coordinates x=8, y=83. The first operation is thus completed. There are then 31 similar operations in order to process the 31 remaining columns of the upper half of the square to be processed and then 32 similar operations for processing the 32 columns of the bottom half of this square.

The difficulty appears from the first step of the first operation. It is then the same for all of the steps of all of the operations. For this first step, it is necessary to read a 16×1 vertical segment whose top end has the coordinates x=7, y=3 and whose bottom end has the coordinates x=7, y=18. As shown in the figure, the pixels to be read for the PEs 3 to 15 are stored at the address 7 whilst the pixels to be read for the PEs 0 to 2 are stored at the address 71.

However, on a conventional SIMD the sequencer sends the same address to all of the PEs.

It can be objected that the chosen example relates to a rectangle whose edges are not aligned with the boundaries between zones of homogeneous addresses, that is to say a rectangle whose top edge has a y coordinate which is not a multiple of the number of PEs. This objection does not withstand analysis. On the one hand, the case of having to process such rectangles is a frequent case in image processing. On the other hand, even if the rectangle containing the result image had edges aligned with the boundaries between zones of homogeneous addresses, it would nevertheless be necessary, in order to process the different steps of a 3×3 convolution, to fetch as operands 16×1 vertical segments whose ends would not all be aligned with the boundaries between zones of homogeneous addresses.

Several techniques for overcoming this difficulty have been proposed.

A first technique is a loading in two phases with a conditional activation of the PEs. In a first phase, only the PEs which must read at the address 7 actually carry out the read operation. In a second phase, only the PEs which must read at the address 71 actually carry out the read operation. It is therefore the programmer of the operation who must manage the fact that, in order to carry out this first step, certain PEs must load as an operand a pixel which they have stored at the address 7 whereas other PEs must load as an operand a pixel that they have stored at the address 71. A great difficulty in programming this type of machine arises from this. There is also a lower execution efficiency due to the surplus of instructions to be executed.

A second technique is the installation of an indirection register within each PE. An indirection register is a register which makes it possible to access a word whose address is contained in this register. Because of this indirection register, each PE can calculate an address which is its own, load it into the indirection register and use it for accessing its own memory. However, as for the first technique, there is again, on the one hand, an additional programming difficulty since it is the application programmer who must manage the difficulty and, on the other hand, a lower execution efficiency due to surplus of instructions to be executed.

Other techniques have been considered. All of them have in common the fact that they give rise, on the one hand, to an additional programming difficulty and, on the other hand, to a lower execution efficiency due to the surplus of instructions to be executed.

The difficulty is even greater if an SIMD organized according to a bidimensional topology is used. FIGS. 4a and 4b again use the same example of an image of width 64 pixels but use SIMD of 16 PEs organized according to 4×4 toroid topology. For the first step of the first operation, it is necessary to read a 4×4 square whose top left corner has the coordinates x=7, y=3 and whose bottom right corner has the coordinates x=10, y=6. This square is shown in light gray in FIG. 4a. As shown in FIG. 4b, the pixels to be read are no longer stored at two different addresses as before but at four different addresses: address 1 for PE15, address 2 for PEs 12, 13 and 14, address 17 for PEs 3, 7 and 11, and address 18 for the other PEs.

The difficulty again increases if an SIMD organized according to a multidimensional topology is used. For example, the pixels to be read are stored at eight different addresses in three-dimensional topology and at 16 different addresses in quadric-dimensional topology, except in special cases (particular position of the zone to be read or written) where the number of different addresses is lower.

The purpose of the invention is to overcome these disadvantages.

BRIEF DESCRIPTION OF THE INVENTION

The invention is based on the fact that the instruction, instead of defining the set of reads and/or the set of writes of the elementary processors by indicating the address at which each elementary processor reads or writes in its own memory, defines the set of reads and/or writes of each of the elementary processors in its own memory as being a read and/or a write in a field of action.

As seen by the user, the set of memory-words of the set of elementary processors is seen as a unique data structure of the table of dimension N type, this table being able to represent a signal (dimension 1) or an image (dimension 2) or a volume (dimension 3) or . . . . The field of action is defined by the instruction by reference to this data structure and as being a sub-set of this data structure.

The term "field of action" refers to a set of memory-words at the rate of one memory-word per elementary processor, this memory-word being located in the memory of the elementary processor, a field of action of an operand being the set of memory-words read by the elementary processors, each in its own memory, in order to acquire this operand, a field of action of a result being the set of memory-words written by the elementary processors, each in its own memory, in order to store this result.

The instruction comprises, for each operand and/or each result, information relative to the position of this field of action, this position being defined as being a position within a unique data structure of the table of dimension N type (signal or image or volume or . . . ), distributed over the memories of the different elementary processors, N being an integer equal to or greater than 1. Hereafter, data structure will refer to this unique data structure of the table of dimension N type.

The position of the field of action makes it possible to calculate the address at which each elementary processor must read, in its own memory, the memory-word which relates to it in the operand and/or write, in its own memory, the memory-word which relates to it in the result.

A typical instruction on a modern SIMD requests all of the PEs, or certain of them, all to carry out the same operation, relating to several operands, and to store the result in one or more locations.

Taking the example of FIG. 2 again, the first step of the first operation necessitates reading a 16×1 vertical segment whose top end has the coordinates x=7, y=3 and whose bottom end has the coordinates x=7, y=18. The field of action of the operand 1(x−1, y−1) is composed of pixels having the coordinates (x=7, y=3), (x=7, y=4), (x=7, y=5), . . . , (x=7, y=18); as shown in the figure, the pixels to be read for PEs 3 to 15 are stored at the address 7 whilst the pixels to be read for PEs 0 to 2 are stored at the address 71.

In a conventional SIMD computer, the instruction defines, for each operand and for each result, the address where the different PEs will read the operand or store the result, Consequently, a conventional SIMD only knows how to take into account fields of action corresponding to homogeneous addressing zones. For example, in a conventional SIMD, it is possible to take into account a field of action whose top end has the coordinates x=7, y=0 and whose bottom end has the coordinates x=7, y=15, because all of these pixels are stored at the address 7, or a field of action whose top end has the coordinates x=7, y=16 and whose bottom end has the coordinates x=7, y=31 because all of these pixels are stored at the address 71, but not a field of action whose top end has the coordinates x=7, y=3 and whose bottom end has the coordinates x=7, y=18 because certain pixels are stored at the address 7 and others at the address 71. In other words, in a conventional SIMD it is not possible to take a field of action into account when the latter spans non-homogeneous address zones.

A parallel processor designed according to the invention allows different operands or results of an instruction to take into account fields of action which do not necessarily correspond to homogeneous address zones.

More precisely, the subject of the invention is a parallel processor which comprises elementary processors PE each comprising at least one calculating unit and at least one memory which comprises memory-words, and disposed according to a topology, with a predetermined position within this topology and capable of simultaneously executing the same instruction on different data, the instruction comprising the reading of at least one operand and/or comprising the writing of at least one result. It is principally characterized in that the instruction defines the set of reads and/or the set of writes of the elementary processors, each in its own memory, as being a read and/or a write in a field of action, a field of action being a set of memory-words at the rate of one memory-word per elementary processor, this memory-word being located in the memory of the elementary processor, a field of action of an operand being the set of memory-words read by the elementary processors, each in its own memory, in order to acquire this operand, a field of action of a result being the set of memory-words written by the elementary processors, each in its own memory, in order to store this result, in that the instruction comprises, for each operand and/or each result, information relating to the position of this field of action, in that the position of the field of action is defined as being a position within a unique data structure of the table of dimension N type, N being an integer equal to or greater than 1, and in that this table is distributed over the memories of the different elementary processors.

The proposed parallel processor uses the following principle: for each operand and for each element of the data structure where the result is stored, the instruction defines not the address at which the PE must read the operand or write the result, but information making it possible to define the position of the field of action of the operand or of the result within the data structure. Using this information and a value related to the position of each PE, the calculating means make it possible for each PE to know the address at which it must read the operand or write the result.

In this way, the address at which each PE reads or writes directly in its own memory is obtained by a calculation and this calculation is carried out according to the position of the field of action and the position of the PE within the topology.

The shape of these fields of action (horizontal or vertical segment, square, rectangle or parallelepiped) stays the same as on a conventional SIMD because it is modeled on the topology of the PEs.

On the other hand, the position of the field of action is defined in a much more flexible way than on a conventional SIMD. In particular, such a parallel processor makes it possible to take into account fields of action such as those mentioned in the image processing example and illustrated by FIGS. 2, 3 and 4; and this is so even though the cells which compose these fields of action are located at different addresses depending on the PEs.

Its advantage, however, goes even further. By way of example, all of the applications which use algorithms in which a pixel is calculated from its neighbors can benefit from it. This covers signal processing, image processing, image compression, synthetic image generation and even certain techniques for solving partial differential equations. A typical example is the solving of partial differential equations in a three-dimensional space using the finite difference method.

There is a double benefit for these applications:
the programming of an algorithm is simplified because the programmer no longer has to be preoccupied by the concept of boundaries between homogeneous address zones,
the execution is accelerated because there are fewer instructions to be executed.

According to a feature of the invention, the parallel processor comprises means of calculating the position of the field of action as a function of said information, connected to the means of calculating the address.

The means of calculating the address within each elementary processor as a function of the position of the field of action can be
either entirely localized at the level of each elementary processor,
or partially localized at the level of each elementary processor and partially grouped between several elementary processors.

The parallel processor according to the invention possibly comprises means of calculating the position of the field of action as a function of said information. These means of calculating the position of the field of action can be
either entirely grouped between all of the PEs,
or entirely localized at the level of each elementary processor,
or partially grouped between several PEs and partially localized at the level of other elementary processors.

According to a feature of the invention, the calculation of the address of the element of the data structure which relates to an elementary processor of p coordinate in the ring (i.e. 1-dimensional topology) is obtained by combination of a value related to the position of the field and a value related to the position of the elementary processor.

According to one embodiment of the invention, the field of action has ends defined by its coordinates; the position of the field of action is for example defined by the position of the end whose coordinates are minimal.

According to a feature of the invention, for a dimension the means of calculating the address of the element of the data structure which relates to an elementary processor, whose coordinate is p according to said 1-dimensional topology, as a function of the position of the field of action comprise means of calculating:

$$Ad = \mathrm{Int}((W\min + Np - 1 - p)/Np),$$

Np being the number of elementary processors, p being the coordinate of said elementary processor in said 1-dimensional topology, W min being defined as a function of the coordinates of said position on the field of action.

The parallel processor is, for example, of the SIMD type.

BRIEF DESCRIPTION OF THE DRAWINGS

Other features and advantages of the invention will appear on reading the following detailed description, given by way of non-limiting example and with reference to the appended drawings in which:

FIG. 2 illustrates a storage of the 64×64 pixels of an image in an SIMD computer with 16 PEs organized as a ring,
FIG. 3 illustrates another storage of the 64×64 pixels of an image in an SIMD computer with 16 PEs organized as a ring,
FIGS. 4a and 4b illustrate a storage of the 64×04 pixels of an image in an SIMD computer having 16 PEs organized as a 4×4 toroid, FIG. 4a representing the PEs in question, FIG. 4b representing less addresses within the PEs.

The same elements are indicated by the same references in all of the figures.

DETAILED DESCRIPTION OF THE INVENTION

According to the invention, the instruction does not define the address at which each PE must read an operand or write a result but information on the position of the field of action within the processed data structure. This position can be defined either in absolute value, or in relative value with respect to a preceding position. A certain number of calculation steps are therefore necessary in order to derive from it an address proper to each PE.

A first step consists in calculating the position of the field of action from the instruction being executed if this is not defined as an absolute value by the instruction. At the end of this first step, the result is independent of the PE.

A second step consists in calculating the address, at which each PE must read an operand or write a result, from the position of the field of action. As will be seen in the examples below, the address is obtained by addition or subtraction of a value related to the position of the field of action and a value related to the position of the PE. At the end of this second step, the result depends on the PE.

Depending on whether it is sought to optimize (for example: rather the number of wires or rather the number of gates), these calculations can be carried out either to the maximum centrally and therefore once and for all and shared between several PEs, or, on the contrary, carried out to the maximum locally at the level of each PE or any intermediate method of grouping of certain common calculations. As there are numerous variants, it is not possible to describe all of them and the description will be limited to a few examples.

Figure 1:
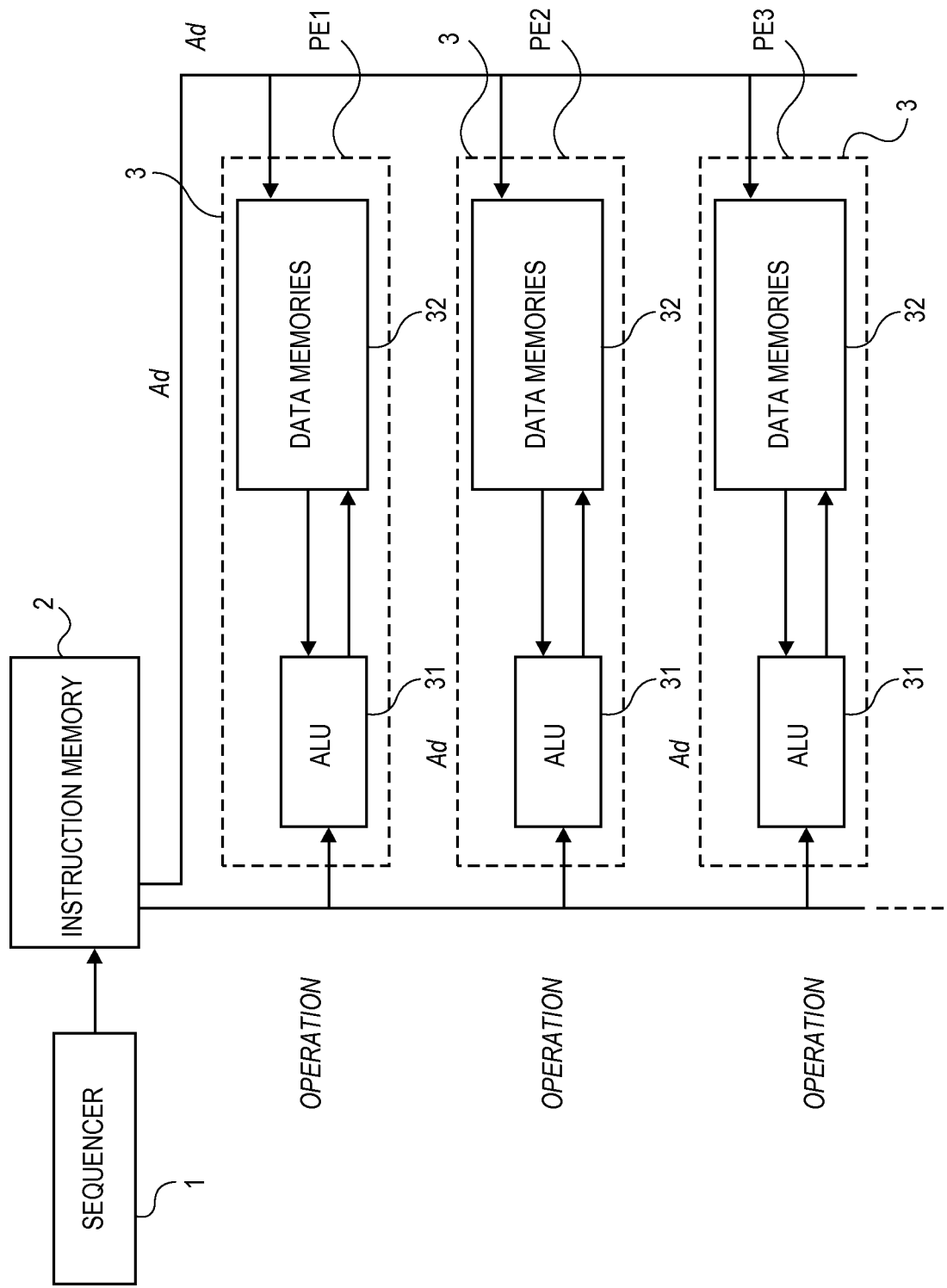
FIG. 1 is a diagrammatic representation of an example of an SIMD computer according to the prior art.
Figure 5:
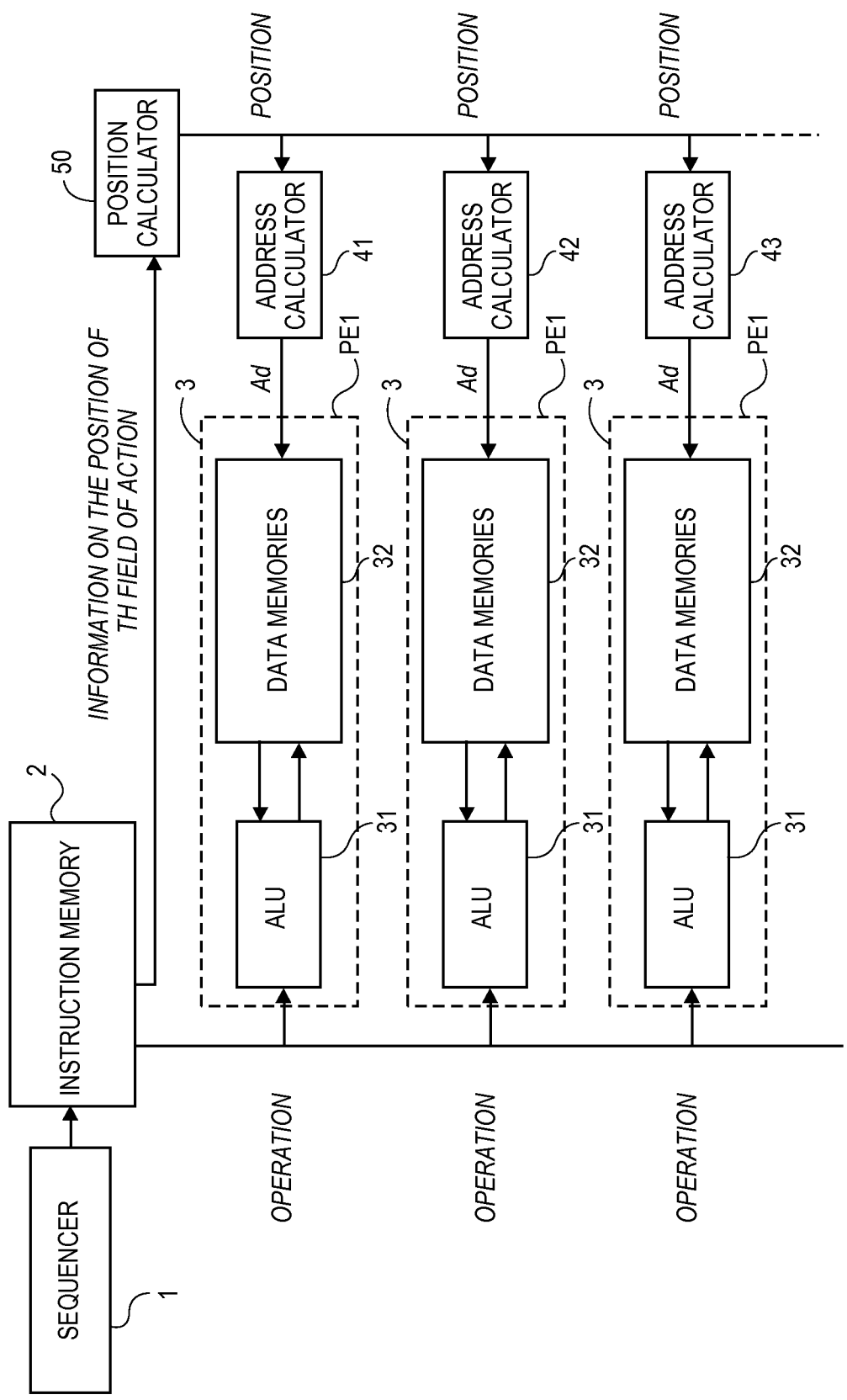
FIG. 5 is a diagrammatic representation of an example of a parallel processor according to the invention.

Thus, an implementation shown in FIG. 5 can consist in calculating the position of the field of action centrally by the calculating means 50 whilst each PE uses this information in order to derive from it an address Ad in its set of memories and/or registers; this address is obtained by the address calculation means 41, 42, 43 of each PE. The advantage of this principle is that it minimizes the volume of calculations to be carried out in each PE and therefore the volume of hardware.

If delocalization is pushed to the extreme, another implementation can consist in calculating everything at the level of each PE: the position of the field of action and the corresponding address. The disadvantage of this variant is that it increases the volume of calculations to be carried out in each PE and therefore the volume of hardware. However, it can make it possible to reduce the volume of information to be transmitted to all of the PEs and therefore the number of wires in the circuit, which can be advantageous in certain cases.

Opposite to this, it may be desired to reduce to the minimum the volume of calculations to be carried out in each PE and therefore the volume of hardware. Another implementation can therefore consist in mutualizing certain calculations common to several PEs at the level of a group of PEs, or even centrally. An example of this will be seen in the fourth example embodiment.

The address calculation means 41, 42, 43 of each PE can be produced by means of hard-wired hardware or more flexible hardware, for example a programmable processor. The calculations can also be carried out in a purely software manner by the ALUs of the PEs, without therefore adding any additional hardware, provided that each PE has an indirection register. Such an implementation, which is even more economical in hardware, can therefore be advantageous in certain applications.

Different choices are possible with regard to the information defining the position of the field of action; for example, the center of the field or an end in a previously defined direction. As all of these choices are equivalent to a close translation and the change from one to the other is trivial, this matter will not be described in greater detail. In fact, these choices have in common the fact that the position of the field of action is defined by the position of a barycenter obtained by linear combination of the ends, the sum of the significances of the ends being equal to 1. In order to describe the example embodiments, the case where the information chosen for defining the position of a field of action is the point of the field for which all of the coordinates are minimal has been chosen. In other words, the end of the field in the direction from the point to infinity is equal to $-\infty$ on each coordinate. In FIGS. 2, 3 and 4, let the point having coordinates (7, 3) be used for the first step of the first operation.

The invention can be applied to parallel processors having mono-, bi-, tri- or multi-dimensional topologies and, in each of these topologies, on data structures that are mono-dimensional (for example: signal), bidimensional (for example: image) tridimensional (for example: 3D volume for solving partial differential equations) or multi-dimensional and also for different methods of storing each data structure on each type of parallel processor.

The invention can also be applied to processing architectures using a large number of elementary processors executing the same processing on different data, including if this architecture does not belong to the SIMD category. For example, if the control structure is not a sequencer or is not programmable or if the programming is carried out at a higher level than an instruction.

Several examples of embodiment will now be described in detail.

The first example of embodiment relates to the case of a mono-dimensional parallel processor, for example with ring structure and a mono-dimensional data structure, for example a signal.

The case is considered where the user has stored his data on the parallel processors as follows: the element x of the signal is stored in PE $N_o$ p at the address Ad where:

$$p=x \bmod Np$$

$$Ad=\text{Int}(x/Np)$$

Np being the number of PEs.

In this case, the set of PEs is seen as a segment of width Np and the field of action is a segment of width Np: it contains Np elements.

The case is considered where the information used for defining the position of the field is the x coordinate of the left end of the field, the one whose x coordinate is a minimum. Let X min be this x coordinate; the field of action therefore extends from X min to X min+Np−1. Each PE is concerned with one and only one of these elements.

The equation making it possible to calculate the address of the element which relates to PE N° p within the field is as follows:

$$Ad=\text{Int}((X \min+Np-1-p)/Np)$$

This equation can give rise to numerous implementations, ranging from pure hardware to pure software.

Reference is made however to a particularly simple hardware implementation in the case where Np is a power of 2. In fact, in this case, if LNp denotes the base 2 logarithm of Np, the method of calculating Ad from X min is as follows:

Add X min and (Np−1−p). It is moreover observed that, for each PE, (Np−1−p) is a constant equal to the twos complement of p (which is obtained by inverting all the bits of p) and that this constant can be retained in memory in PE $N_o$ p.

Delete the last LNp bits of the result.

In total, there is a single addition per PE.

Figure 6A:
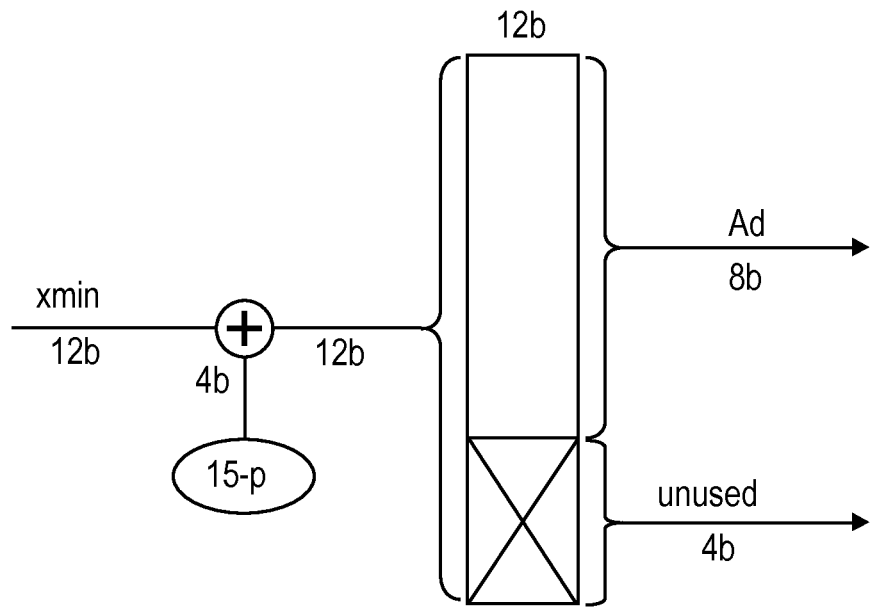
FIGS. 6a to 6e are diagrammatic representations of examples of hardware embodiment of the address calculating means according to the invention in the following cases:
  mono-dimensional parallel processor and mono-dimensional data structure (FIG. 6a),
  mono-dimensional parallel processor and bidimensional data structure (FIG. 6b),
  mono-dimensional parallel processor and multidimensional data structure (FIG. 6c),
  bidimensional parallel processor and bidimensional data structure (FIGS. 6d and 6e).

This implementation is illustrated in FIG. 6a for Np=16, LNp=4 and X min is in 12 bits. It is characterized by the fact that the address at which a PE must read an operand or write an address is obtained by addition (or subtraction) of a value related to the position of the field and a value related to the position of the PE.

This particularly simple type of implementation can be transposed over all of the example embodiments which will be described. More generally, it can be transposed on any type of parallel processor organized using mono-, bi-, tri- or multi-dimensional topologies and, in each of these topologies, on data structures of the mono- (for example: signal), bi- (for example: image), tri- (for example: 3D volume) or multi-dimensional type. In fact it suffices to rework the calculation according to the type of parallel processor, the data structure and the chosen storage and then adapting the implementation accordingly.

The second example embodiment relates to the case of a mono-dimensional parallel processor, for example with ring structure, and a bidimensional data structure, for example an image.

The calculation used for a mono-dimensional data structure can be used again by transposing it onto a bidimensional data structure; equations are derived from this and the application is adapted accordingly.

It is also possible to use a method which makes it possible to process a bidimensional data structure by coming back to the case that has just been analyzed for a mono-dimensional data structure.

Let Np be the number of PEs, Lx the width of the image to be processed, that is to say the number of pixels on each line and let Ly be its height, that is to say the number of pixels on each column. More precisely, it is a matter of the upper limits for the numbers of PEs and of pixels on each line and each column. In fact, in most cases and for the purpose of simplifying the hardware, it is preferred to place the image to be processed inside a bigger image and therefore to choose values of Lx and Ly greater than the dimensions of the image to be processed. On the one hand, if several images of different sizes have to be processed, it may be preferred to make a single choice making it possible to process the biggest of them. On the other hand, in order to simplify the implementation when the latter is a hardware one, a power of 2 is often chosen.

One way of returning to a mono-dimensional data structure (in other words, a way of storing the pixels on the PEs) is to write, for each pixel (x, y):

$$w=x+Lx*y$$

This type of storage, shown in FIG. 3, amounts to considering the set of PEs as a horizontal block of PEs, each PE being responsible for one column or for several columns. It differs from the one analyzed previously and shown in FIG. 2, which amounts to considering the set of PEs as a vertical block of PEs, each PE being responsible for one line or for several lines. In this case, it is necessary to write, for each pixel (x, y):

$$w=y+Ly*x$$

Comparing these two formulae, it can easily be understood how to change from one storage system to the other. Moreover a general way of changing from one storage system to another will be mentioned below. For the moment the description is limited to the first storage system, used in FIG. 3 and characterized by the transformation:

$$w=x+Lx*y$$

By means of this transformation, it is possible to store the pixels on the parallel processor as it was done for the first embodiment: the element w of the signal is stored in PE $N_o$ p at the address Ad where:

$$p=w \bmod Np$$

$$Ad=\text{Int}(w/Np)$$

In this case, the field of action is a horizontal segment of width Np.

By way of example, the case is considered where the information used for defining the position of the field is the position of the end of the field whose coordinates are minimal.

Let X min, Y min be the coordinates of this point.

Supposing:

$$W \min=X \min+Lx*Y \min$$

The equation allowing PE $N_o$ p to calculate the address of the pixel with which it is concerned within the field is as follows:

$$Ad=\text{Int}((W \min+Np-1-p)/Np)$$

It is the same equation as in the first embodiment. W min simply replaces X min. There is thus a simple way of transposing, to a bidimensional data structure, any implementation usable for a mono-dimensional structure and notably the one that has been described. If Np and Lx are powers of 2, there is only one single addition per PE. Let LNp and LLx denote their respective logarithms. To further simplify the embodiment, rather than carrying out this addition on W min, it is observed that in reality it only affects X min, that is to say Lx bits only. The other operations are concatenations of bits, much simpler than additions. Thus simplified, the method of calculating Ad from X min. Y min is as follows:

Add $X$ min and $(Np-1-p)$.

Delete the last LNp bits of the result.

Concatenate, in least significant position, the preceding quantity represented on LLx-LNp bits and Y min in most significant position.

Figure 6B:
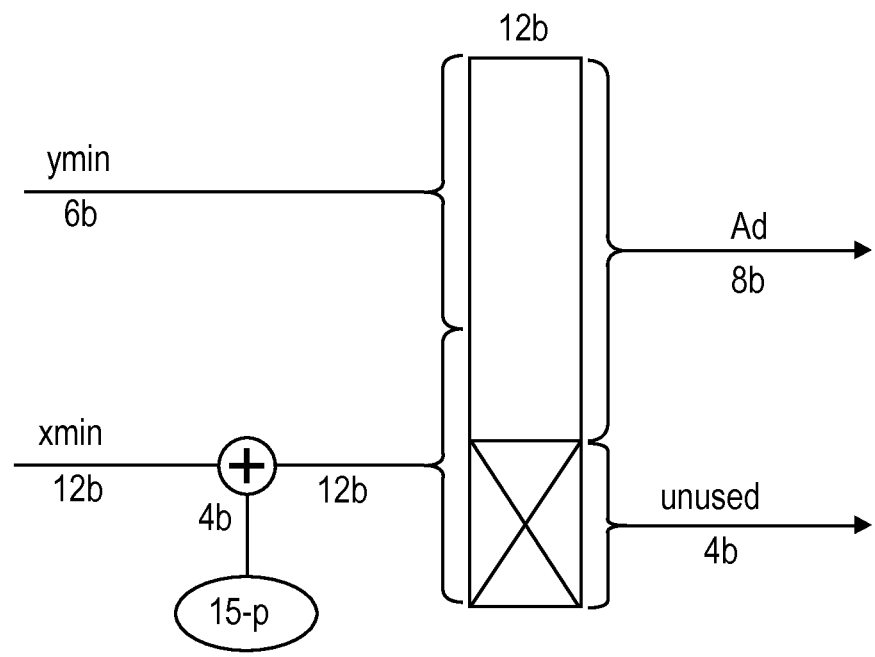

This implementation is illustrated by FIG. 6*b* for Np=16, LNp=4, X min and Y min on 6 bits.

The third example embodiment is the case of a mono-dimensional parallel processor (for example with ring structure) and a data structure of dimension greater than 2.

Firstly the case of a tridimensional data structure (for example a 3D volume) is considered.

Let Lx be the width of the volume to be processed and Ly its depth and Lz its height, or more exactly, for the reasons that have been seen before, upper limits of these three quantities.

One way of returning to a mono-dimensional data structure (in other words, a way of storing the pixels on the PEs) is to write, for each pixel (x, y, z):

$w=x+Lx*(y+Ly*z)$

The storage system $w=x+Lx*(y+Ly*z)$ is considered below.

The reasoning can easily be transposed to other storage systems such as:

$w=x+Lx*(z+Lz*y))$ $w=y+Ly*(x+Lx*z))$ $w=y+Ly*(z+Lz*x))$ $w=z+Lz*(x+Lx*y))$ $w=z+Lz*(y+Ly*x))$

Because of this transformation, the pixels can be stored on the parallel processor like they were for the first embodiment: the element w of the signal is stored in PE $N_o$ p at the address Ad where:

$p=w$ Mod $Np$ $Ad=\mathrm{Int}(w/Np)$

In this case, the set of PEs is seen as a horizontal segment of width Np and the field of action is a horizontal segment of width Np.

By way of example, the case is considered where the information used for defining the position of the field is the position of the end of the field whose coordinates are minimal. Let X min, Y min, Z min be the coordinates of this point.

Assuming: $W$ min$=X$ min$+Lx*(Y$ min$+Ly*Z$ min$))$

The equation allowing the PE N° p to calculate the address of the pixel which relates to it within the field is as follows:

$Ad=\mathrm{Int}((W\ \mathrm{min}+Np-1-p)/Np)$

It is the same equation as in the first embodiment. W min simply replaces X min. There is thus a simple means of transposing, to a tridimensional data structure, any implementation usable for a mono-dimensional data structure and notably the one that has been described. If Np, Lx and Ly are powers of 2, there is only a single addition per PE. LNp, LLx and LLy denote their respective logarithms. To further simplify the embodiment, rather than carrying out this addition on W min, it is observed that in reality it only relates to X min, that is to say to Lx bits only. The other operations are concatenations of bits, much simpler than additions. Thus simplified, the method of calculating Ad from X min, Y min, Z min is as follows:

Add X min and (Np−1−p).

Delete the last LNp bits of the result.

Concatenate, in least significant position, the preceding quantity represented on Lx-LNp bits, in middle significance position Y min represented on Ly bits and in most significant position Z min represented on Lz bits.

The same principle can be applied to data structures of any dimension whatsoever. Thus, with dimension 4, it suffices:

to write for each pixel (x, y, z, t):

$w=x+Lx*(y+Ly*(z+Lz*t))$, to define the position of the field of action using X min, Y min, Z min, T min, to assume: W min=X min+Lx(Y min+Ly*(Z min+Lz*T min)), and finally to calculate for each PE:

$Ad=\mathrm{Int}((W\ \mathrm{min}+Np-1-p)/Np$.

The fourth example of embodiment is the case of a bidimensional parallel processor, for example with toroid structure, and a bidimensional data structure, for example an image.

Let Nx be the number of PEs on the x axis. Ny the number of PEs on the y axis and therefore Nx*Ny the total number of PEs. Let Lx be the width of the image to be processed and Ly its height, or as seen previously, upper limits of these two quantities. Preferably. Lx and Ly are chosen from the multiples of Nx and Ny respectively. (px, py) denotes the PE having coordinates (px, py) on the toroid of PEs.

By way of example, the case is considered where the user has stored his data on the parallel processor as follows: the pixel (x, y) of the image is stored in the PE (px, py) at the address Ad where:

$px=x$ Mod $Nx$ $py=y$ Mod $Ny$ $Adx=\mathrm{Int}(x/Nx)$ $Ady=\mathrm{Int}(y/Ny)$ $Ad=Adx+(LX/Nx)*Ady$ In the case of the storage system used in FIGS. 4*a* and 4*b*, the set of PEs is seen as a rectangle of width Nx and of height Ny and the field of action is a rectangle of width Nx and of height Ny.

It is observed that this storage system is modeled on the storage system used for a mono-dimensional data structure. In fact, it reproduces this storage system in each of the two directions of space. The processing device will therefore be exactly the same, but will have to be applied in each of the two directions of space.

By way of example, the case where the information used for defining the position of the field is the corner of the field whose coordinates are the smallest, that is to say the end of the field in the direction from the point to infinity is equal to $-\infty$ on each coordinate is again considered. Let X min, Y min be the coordinates of this point.

The equations allowing the PE (px, py) to calculate the address of the element relating to it within the field are as follows:

$$Adx=\mathrm{Int}((X\min+Nx-1-px)/Nx)$$

$$Ady=\mathrm{Int}((Y\min+Ny-1-py)/Ny)$$

$$Ad=Adx+(Lx/Nx)*Ady$$

The equation appearing in the first embodiment and characteristic of the proposed device is found again twice: once on the x axis and once on the y axis. As mentioned before, this can give rise to numerous implementations, ranging from pure hardware to pure software.

However, reference will be made, as was done for the previous embodiments, to a particularly simple hardware implementation in the case where Nx, Ny, Lx and Ly are powers of 2. If LNx denotes the base 2 logarithm of Nx, LNy the base 2 logarithm of Ny, LLx the base 2 logarithm of Lx, LLy the base 2 logarithm of Ly, the method of calculating Ad from X min, Y min is as follows:

Add X min and (Nx−1−px). It is noted that X min, Nx and px are values common to a column of PEs. This calculation therefore has to be carried only once per column of PEs. Furthermore, the quantity (Nx−1−px) is a constant for a column of PEs. It can be retained in a single memory for one column of PEs.

Delete the last LNx bits of the result→Adx on LLx−LNx bits.

Add Y min and (Ny−1−py). It is noted that Y min. Ny and py are values common to a line of PEs. This calculation therefore has to be carried out only once per line of PEs. Furthermore the quantity (Ny−1−py) is a constant for a line of PEs. It can be retained in a single memory for one line of PEs.

Delete the last LNy bits of the result→Ady on LLy−LNy bits.

Ad=Adx+(Lx/Nx)*Ady, which amounts to concatenating, in least significant position, Adx represented over LLx-LNx bits and, in most significant position, Ady represented over LLy-LNy bits.

Figure 6C:
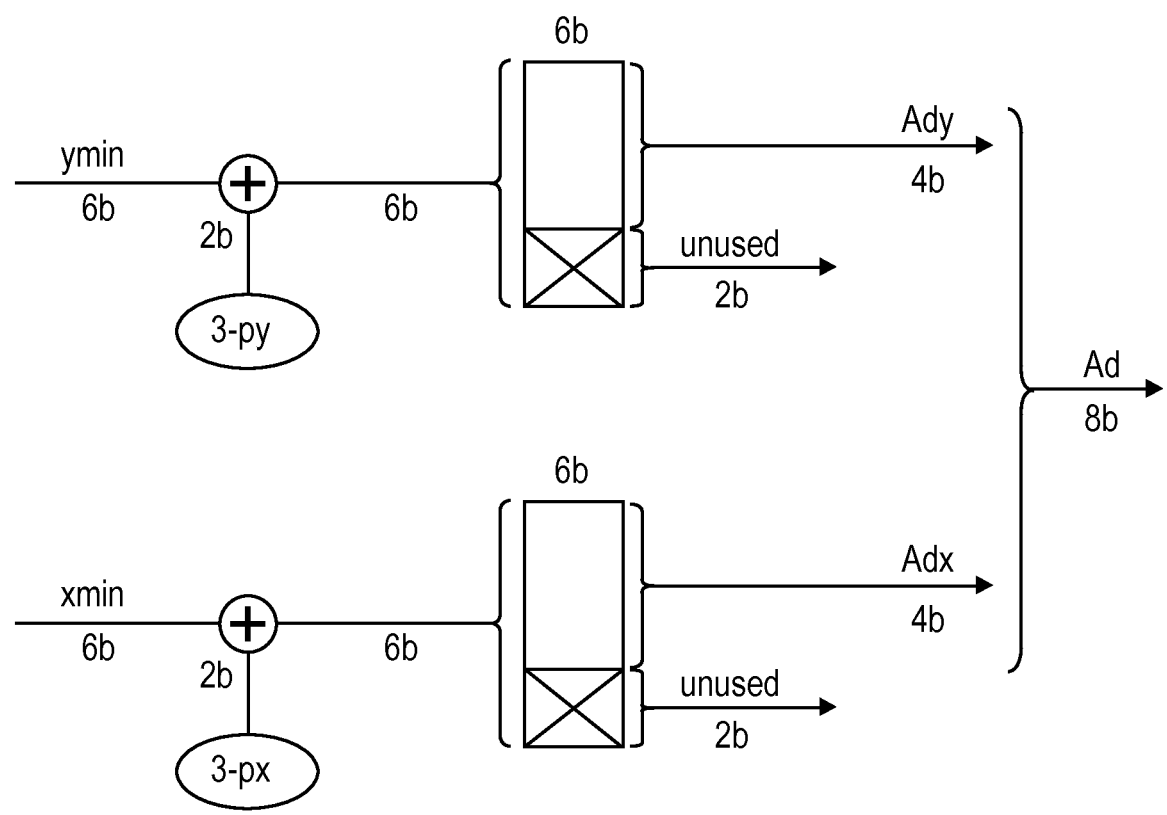

It is confirmed that it was possible to transpose the preceding type of embodiment. There are henceforth a single addition per line of PEs and a single addition per column of PEs. Moreover, these additions affect very few bits. Hence there is an implementation even more economical than that necessary in the preceding embodiments. This implementation is illustrated in FIG. 6c for Nx=4, Ny=4, LNx=2, LNy=2, X min and Y min over 6 bits.

Four embodiments chosen as examples have been analyzed successively:
mono-dimensional parallel processor and mono-dimensional data structure
mono-dimensional parallel processor and bidimensional data structure processor
mono-dimensional parallel processor and multidimensional data structure
bidimensional parallel processor and bidimensional data structure.

However, the proposed principle can be applied to parallel processors organized with mono-, bi-, tri- or multi-dimensional topologies and, in each of these topologies, on mono-, bi-, tri- or multi-dimensional data structures.

The following generalization can be made. Let n be the dimension of the data structure and p be the dimension of the topology of the parallel processor.

If n=p, the principle is applied in each of the p directions, exactly as seen for n=2 (fourth embodiment).

If n>p, as seen in the case of the second and third embodiments, the dimension of the structure is reduced by choosing two axes, (then two others, then two others, ... , until a structure of dimension p is obtained) and reducing these two axes to a single one by applying a formula of the following type:

$$w=x+Lx*y.$$

If n<p, the dimension of the structure is increased, by choosing one axis, (then another, then another, ... , until a structure of dimension p is obtained) and this axis is divided into slices in order to split it into two. Thus, in order to change from one x coordinate to two coordinates w1 and w2, a width of slice Lx is chosen and a formula of the following type is applied:

$$w1=x\ \mathrm{Mod}\ Lx$$

$$w2=\mathrm{Int}(x/Lx).$$

Up until now, embodiments have been analyzed which use a storage system in which two successive elements on an axis (the x axis for example) are retained and processed by two different PEs. Typically, in the mono-dimensional case (first embodiment), the case was considered, by way of example, where the user stored the x element of the signal in the PE at the address Ad where:

$$p=x\ \mathrm{Mod}\ Np$$

$$Ad=\mathrm{Int}(x/Np).$$

Similarly, in the bidimensional case (second embodiment) the case was described, by way of example, where the user stored the pixel (x, y) in PE $N_o$ p at the address Ad where:

$$w=x+Lx*y$$

$$p=w\ \mathrm{Mod}\ Np$$

$$Ad=\mathrm{Int}(w/Np).$$

These are only examples. The method can be applied to many other storage modes.

Thus, in order to remain in the mono-dimensional case, the user may wish to define a size Lx and store the x element of the signal in PE $N_o$ p at the address Ad where:

$$x1=x\ \mathrm{Mod}\ Lx$$

$$x2=\mathrm{Int}(x/Lx)$$

$$p=x2\ \mathrm{Mod}\ Np$$

$$Ad=x1+Lx*\mathrm{Int}(x2/Np).$$

This is a storage mode in which a segment of Lx successive elements on the x axis is retained and processed by the same PE, whilst the next PE retains and processes the next segment.

The equation allowing PE N° p to calculate, from X min, the address of the element relating to it within the field is as follows:

$$X\min 1=X\min\ \mathrm{Mod}\ Lx$$

$$X\min 2=\mathrm{Int}(X\min/Lx)$$

$$Ad=X\min 1+Lx*\mathrm{Int}((X\min 2+Np-1-p)/Np).$$

As can be seen, this amounts to applying the method on X min 2 and not touching X min 1.

The case is considered where Lx and Np are powers of 2 for which a particularly simple hardware implementation is possible. LNp and LLx denote their respective logarithms. The above equations can be interpreted as follows:

Split X min into two parts, the least significant positions over LLx bits constituting X min 1 and the most significant positions constituting X min 2.

Apply the procedure proposed in the first embodiment to X min 2. The result is:

Int((X min 2+Np−1−p)/Np).

Concatenate X min 1 in the least significant positions over Lx bits and the result of the procedure in the most significant positions.

In other words, in the case where Lx and Np are powers of 2, it is necessary to set aside the LLx least significant bits of X min,
to apply the procedure to the other bits of X min,
to concatenate, in the least significant positions, the LLx bits set aside with the result of the procedure.

This extension is totally independent of the extension mentioned in the preceding paragraph; it can be coupled with it. It therefore applies to the multidimensional case, both for the topology of the parallel processor and for the data structure. It suffices to apply it in each of the dimensions. Consequently, the method applies to any storage mode in which a parallelepiped of size Lx on the x axis, Ly on the y axis, . . . is retained and processed by the same PE, whilst the neighboring PEs (for the parallel processor topology) retain and process the neighboring parallelepipeds (for the topology of the data structure).

A generalization can be made for other storage systems. It will be shown in the multidimensional case by assuming the case where the sizes of the data structure (Lx, Ly, Lz, . . . ) and the number of processors (Nx, Ny, Nz, . . . ) in each direction are powers of 2. The fact of choosing powers of 2 makes it possible to explain the operations to be carried out on the binary representations, which is the simplest case, but generalizing for any values whatsoever of Lx, Ly, Lz, Nx, Ny, Nz, . . . is possible by replacing the described operations on the binary representations with mathematical formulae using multiplications, divisions, modulos and integer parts as mentioned in the preceding examples. In order to store the data structure on the parallel processor and then apply the method to this storage system, it is possible to proceed as follows:

Concatenate in a single word of LLx+LLy+LLz+ . . . bits the various coordinates of the point used for defining the position of the field; this amounts to forming what was previously called w.

Change the order of bits of w (there are as many possible storage systems as there are possible permutations); Let w' be the word thus obtained.

Split w' into words of size LLx, LLy, LLz, . . . bits; let wx', wy', wz', . . . be the words thus obtained.

Apply the method in each of the dimensions of the parallel processor, that is to say:

add (Nx−1−px) to wx',
delete the last LNx bits of the result; Adx' is obtained,
add (Ny−1−py) to wy',
delete the last LNy bits of the result; Ady' is obtained,
and so on in each direction of the parallel processor.

Change again the order of bits of Adx', Ady', Adz', . . . according to a permutation which is not necessarily related to the previous permutation. In this way the storage addresses Adx, Ady, Adz in each of the directions of the parallel processor are obtained.

Concatenate these addresses in a single word Ad which represents the address relating to the field within each PE.

The example illustrated by FIG. 2 will be used again in order to illustrate this. It is recalled that this example relates to a mono-dimensional parallel processor of 16 PEs having a ring structure, that the data structure is an image of size Lx=64 and Ly=64 and that the pixels of the image are stored in line. The case is therefore as follows Np=16→LNp=4

Lx=64→LLx=6

Ly=64→LLy=6

The operation to change from X min, Y min to Ad is as follows:

Concatenate X min, Y min in a single word of 6+6=12 bits. Let w be the word thus obtained.

Swap the 6 least significant bits and the 6 most significant bits of w. Let w' be the word thus obtained.

Apply the method In the case of a mono-dimensional parallel processor, that is to say:

Add (16−1−p) to w',
Delete the last 4 bits of the result. Ad' is obtained.
Swap the 2 least significant bits and the 6 most significant bits of Ad'. The word thus obtained is the address Ad.

This comes within the context of the generalization that is desired to be illustrated. This implementation is illustrated in 6d with Nx=4, Ny=4, LNx=2, LNy=2, X min and Y min on 6 bits: it is a variant embodiment of 6b with a modification of the storage mode.

Figure 6D:
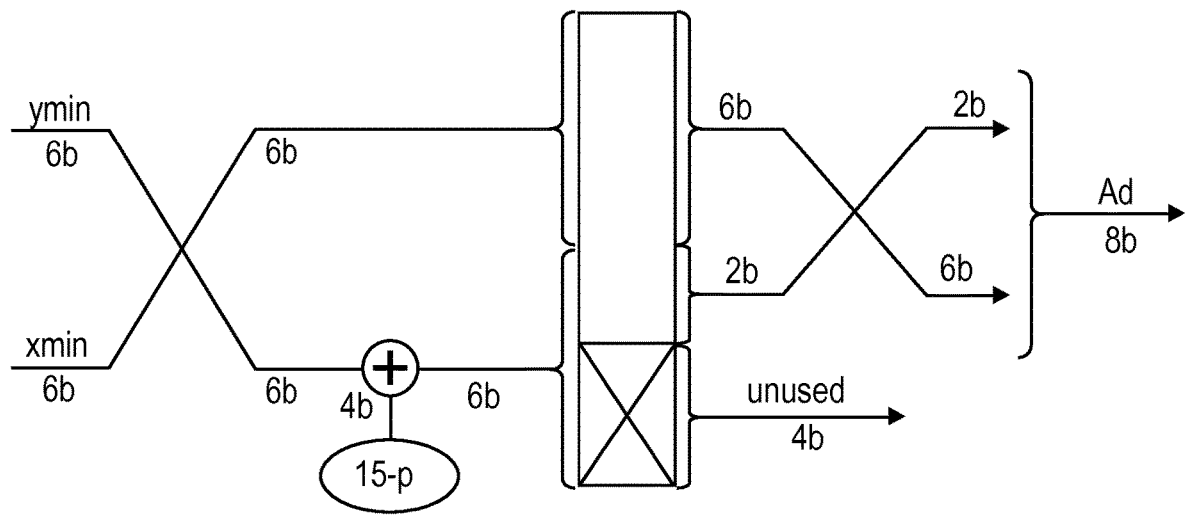
Figure 6E:
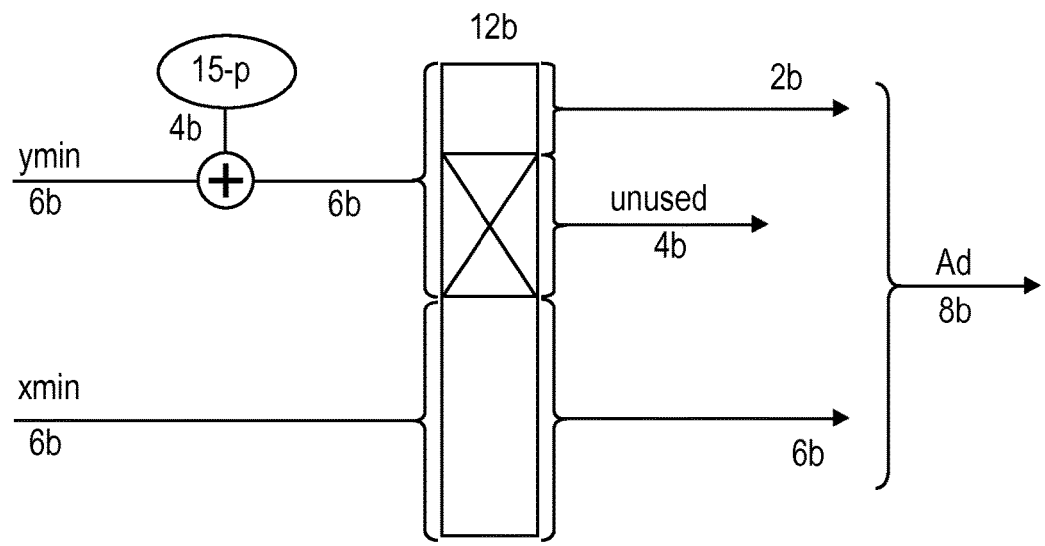

It is observed that FIG. 6d can be made easier to read by decreasing the wires without modifying the device in the least. FIG. 6e is thus obtained.

Many other storage modes are possible. The simplest variants consist, for example, in changing the signs in the formulae or in changing the order of the PEs. It is impossible to mention all of them.

The invention claimed is:

1. A parallel processor comprising:
a number Np of elementary processors, Np≥2, each having a respective calculating unit and a respective memory, each said respective memory of the Np elementary processors including memory words, the Np elementary processors being disposed according to a P-dimensional topology, P≥1, with a predetermined position for each of the Np elementary processors, each of said Np elementary processors being configured to simultaneously execute a same instruction on different data of an N-dimensional data structure, N≥1, including elements, each element of said data structure being attributed to one elementary processor and to one address inside the attributed elementary processor, the instruction including reading at least one operand and/or writing at least one result;
wherein the instruction, without providing an address for the at least one operand and/or an address for the at least one result within each said memory for each elementary processor to read or write, defines a position of a field of action in said data structure, the field of action being an Np sized data subset of said data structure, the data in the Np sized data subset being distributed according to the P dimension(s) of the P-dimensional topology; and wherein the parallel processor is further configured to calculate the address for the at least one operand and/or the address for the at least one result within each of said elementary processors to read or write, as a function of the position of the field of action and as a function of: said predetermined position of each elementary processor in the P-dimensional topology, and said number Np of the elementary processors, wherein the address for the at least one operand and/or the address for the at least one result within each of said elementary processors to read or write is obtained by a formula which contains an addition or subtraction of a value related to the position of the field of action and a value related to the predetermined position of each elementary processor.

2. The parallel processor as claimed in claim 1, wherein the parallel processor is further configured for centrally calculating the position of the field of action for the at least one operand or for the at least one result and sharing the calculated position between the elementary processors.

3. The parallel processor as claimed in claim 1, wherein the parallel processor is further configured for locally calculating said address for said at least one operand or said address for said at least one result at a level of each of said elementary processors.

4. The parallel processor as claimed in claim 1, wherein the parallel processor is configured for partially grouping the calculation of said address for said at least one operand or said address for said at least one result between several elementary processors and partially locally carrying out the calculation of said address for said at least one operand or said address for said at least one result at a level of each of said elementary processors.

5. The parallel processor as claimed in claim 1, wherein, for each given dimension of said P dimension(s), the parallel processor is configured to calculate an address of an element of the data structure which relates to one of the Np elementary processors, wherein said address of the element of the data structure is calculated by combining (i) a value related to the position of the field of action for the at least one operand or for the at least one result and (ii) a value related to a position p of the one of the Np elementary processors in said given dimension, p being an integer.

6. The parallel processor as claimed in claim 1, wherein with the field of action for the at least one operand or for the at least one result having ends defined by respective coordinates and by respective positions of the ends in the topology, the position of the field of action for the at least one operand or for the at least one result is defined by a position of one of the ends whose coordinates are a minimum among the respective coordinates.

7. The parallel processor as claimed in claim 1, wherein the topology has one dimension, and the parallel processor is configured to calculate an address (Ad) of an element of the data structure which relates to a particular one of the Np elementary processors as follows:

$$Ad=\text{Int}((W\min+Np-1-p)/Np), \text{ and where Int is an integer part of } (W\min+Np-1-p)/Np,$$

where p is a position of said elementary processor, p being an integer, and W min is a value defined on said N dimensions as a function of coordinates of said position of the field of action.

8. The parallel processor as claimed in claim 7, wherein the topology has one dimension, the data structure is monodimensional, and the position of the field of action for the at least one operand or for the at least one result is defined as a minimum value (X min) of an X coordinate such that W min=X min.

9. The parallel processor as claimed in claim 8, wherein Np is a power of 2, and the address (Ad) of an element of the data structure is calculated by steps:
 (1) adding X min and (Np−1−p), and
 (2) deleting the last LNp bits of a result of the adding in step (1), LNp being the base 2 logarithm of Np.

10. The parallel processor as claimed in claim 7, wherein the elementary processors are disposed according to the topology having one dimension, and the data structure is bidimensional, said data structure being defined as a function of X and Y coordinates, and wherein the position of the field of action for the at least one operand or for the at least one result is defined by X min and Y min, where W min=X min+Lx*Y min, and X min and Y min are minimum values of the X and the Y coordinates of elements of the field of action, Lx being a width of the bidimensional data structure along an X dimension, and W min being defined on said one dimension as a function of the X and the Y coordinates of said position of the field of action.

11. The parallel processor as claimed in claim 10, wherein when Np and Lx are powers of 2, an address Ad of an element of the data structure is calculated by steps:
 (1) adding X min and (Np−1−p),
 (2) deleting the last LNp bits of a result of the adding in step (1), LNp being the base 2 logarithm of Np, and
 (3) concatenating:
  (a) bits in least significant positions of a quantity resulting from the deleting in step (2), the quantity represented by LLx-LNp bits, and
  (b) bits in Y min in most significant positions, LLx being the base 2 logarithm of Lx.

12. The parallel processor as claimed in claim 7, wherein the elementary processors are disposed according to the topology having one dimension, and the data structure is tridimensional, said data structure being defined as a function of X, Y and Z coordinates, and the position of the field of action for the at least one operand or for the at least one result is defined by X min, Y min, and Z min, and W min=X min+Lx*(Y min+Ly*Z min), where X min, Y min and Z min are minimum values of the X, Y, and Z coordinates, respectively, of elements of the field of action, Lx being the width of the tridimensional data structure along an X dimension, Ly being the width of the tridimensional data structure along a Y dimension, and W min is defined on said one dimension as a function of the X, Y, and Z coordinates of said position of the field of action.

13. The parallel processor as claimed in claim 12, wherein when Np, Lx and Ly are powers of 2, an address Ad of an element of the data structure is calculated by steps:
 (1) adding X min and (Np−1−p),
 (2) deleting the last LNp bits of a result of the adding in step (1), LNp being the base 2 logarithm of Np, and
 (3) concatenating:
  (a) bits in least significant positions of a quantity resulting from the deleting in step (2), the quantity represented by LLx-LNp bits,
  (b) bits in medium significant positions of Y min represented by Ly bits, and
  (c) bits in most significant positions of Z min represented by Lz bits, LLx being the base 2 logarithm of Lx, and Lz being the width of the tridimensional data structure along a Z dimension.

14. The parallel processor as claimed in claim 7, wherein the topology has one dimension, and the data structure has four dimensions, defined as a function of X, Y, Z and T coordinates, and the position of the field of action for the at least one operand or for the at least one result is defined by X min, Y min, Z min, and T min, such that W min=X min+Lx*(Y min+Ly*(Z min+Lz*T min)), where X min, Y min, Z min, and T min are minimum values of the X, Y, Z, and T coordinates of elements of the field of action, Lx being a width of the four dimensional data structure along an X dimension, Ly being a width of the four dimensional data structure along a Y dimension, Lz being a width of the four dimensional data structure along a Z dimension, and W min is defined on said one dimension as a function of the X, Y, Z, and T coordinates of said position of the field of action.

15. The parallel processor as claimed in claim 7, wherein when the topology has at least three dimensions, and comprises a set {Nx, Ny, Nz, ... } of the elementary processors, respectively, in each of the at least three dimensions, Nx, Ny, Nz being integers, the data structure is defined on at least three dimensions, Lx being the width of the at least three dimension data structure along an X dimension, Ly being the width of the at least three dimension data structure along a Y dimension, Lz being the width of the at least three dimension data structure along a Z dimension, and each element of the sets {Nx, Ny, Nz, ... } and {Lx, Ly, Lz, ... } are powers of 2, each element of a set {LLx, LLy, LLz, ... } is the base 2 logarithm of corresponding elements of the set {Lx, Ly, Lz, ... }, an address Ad of an element of the data structure being calculated by steps:
 (1) concatenating coordinates of the position of the field of action for the at least one operand or for the at least one result in a single word (w) with bits equal to a sum of elements of the set {LLx, LLy, LLz, ... },
 (2) swapping an order of the bits of the single word w to obtain a word w',
 (3) splitting the word w' into words of size equal to a size of the set {LLx, LLy, LLz, ... }, the size being expressed in bits, such that a set indicated by {wx', wy', wz', ... } denotes the split words obtained, and for said each dimension of the topology:
  (a) adding (Nx−1−px) to wx' of the set indicated by {wx', wy', wz', ... }, where px is a coordinate along the X dimension, of each of said elementary processors,
  (b) deleting the last LNx bits of a result of the adding in step (a) to obtain another result (Adx'), where LNx denotes the base 2 logarithm of Nx,
  (c) adding (Ny−1−py) to wy' of the set indicated by {wx', wy', wz', ... }, where py is a coordinate along the Y dimension, of each of said elementary processors,
  (d) deleting last LNy bits from a result of the adding in step (c) to obtain another result (Ady'), where LNy denotes the base 2 logarithm of Ny,
  (f) adding (Nz−1−pz) to wz' of the set indicated by {wx', wy', wz', ... }, where pz is a coordinate along the Z dimension, of each of said elementary processors,
  (g) deleting last LNz bits from a result of the adding in step (f) to obtain another result (Adz'), where LNz is the base 2 logarithm of Nz, and
  (h) swapping again an order of the bits of a set indicated by {Adx', Ady', Adz', ... } to obtain addresses Adx, Ady, and Adz in each of the at least three dimensions of the data structure, and
 (4) concatenating the addresses Adx, Ady, and Adz in a single word of the address Ad which represents the address relating to the field of action for the at least operand or for a result within each of the elementary processors.

16. The parallel processor as claimed in claim 1, wherein the topology has two dimensions and comprises an Nx number and an Ny number of the elementary processors, respectively, in each of said two dimensions, Nx and Ny being integers, and the data structure is bidimensional, the data structure being defined as a function of X and Y coordinates for said two dimensions, and the position of the field of action for the at least one operand or for the at least one result is defined by X min and Y min, where X min and Y min are minimum values of the X and Y coordinates of elements of the field of action, and the parallel processor is configured to calculate an address (Ad) of the data structure which relates to each of the elementary processors as:

$$Ad=Adx+(Lx/Nx)*Ady,$$

where:
 Adx=Int((X min+Nx−1−px)/Nx), where Int is an integer part of (X min+Nx−1−px)/Nx, and
 Ady=Int((Y min+Ny−1−py)/Ny), where Int is an integer part of (Y min+Ny−1−py)/Ny, Lx being the width of the bidimensional data structure along an X dimension, px being the coordinate along the X dimension of each of said elementary processors, and py being the coordinate along a Y dimension of each of said elementary processors.

17. The parallel processor as claimed in claim 16, wherein Ly is a width of the bidimensional data structure along the Y dimension; and wherein when Nx, Ny, Lx and Ly are powers of 2, and LLx and LLy are the base 2 logarithms of Lx and Ly, respectively, an address Ad of an element of the data structure is calculated by steps:
 (1) adding X min and (Nx−1−px),
 (2) deleting the last LNx bits of a result of the adding in step (1), LNx being the base 2 logarithm of Nx,
 (3) adding Y min and (Ny−1−py),
 (4) deleting the last LNy bits of a result of the adding in step (3), LNy being the base 2 logarithm of Ny, and
 (5) concatenating:
  (a) bits in least significant positions of said Adx represented by LLx-LNx bits, and
  (b) bits in most significant positions of said Ady represented by LLy-LNy bits.

18. The parallel processor as claimed in claim 1, wherein the parallel processor is of a Single Instruction Multiple Data (SIMD) type parallel processor.

* * * * *